June 11, 1935. E. A. BRUNELLE 2,004,500
COOKING MACHINE
Filed May 6, 1932 5 Sheets-Sheet 1
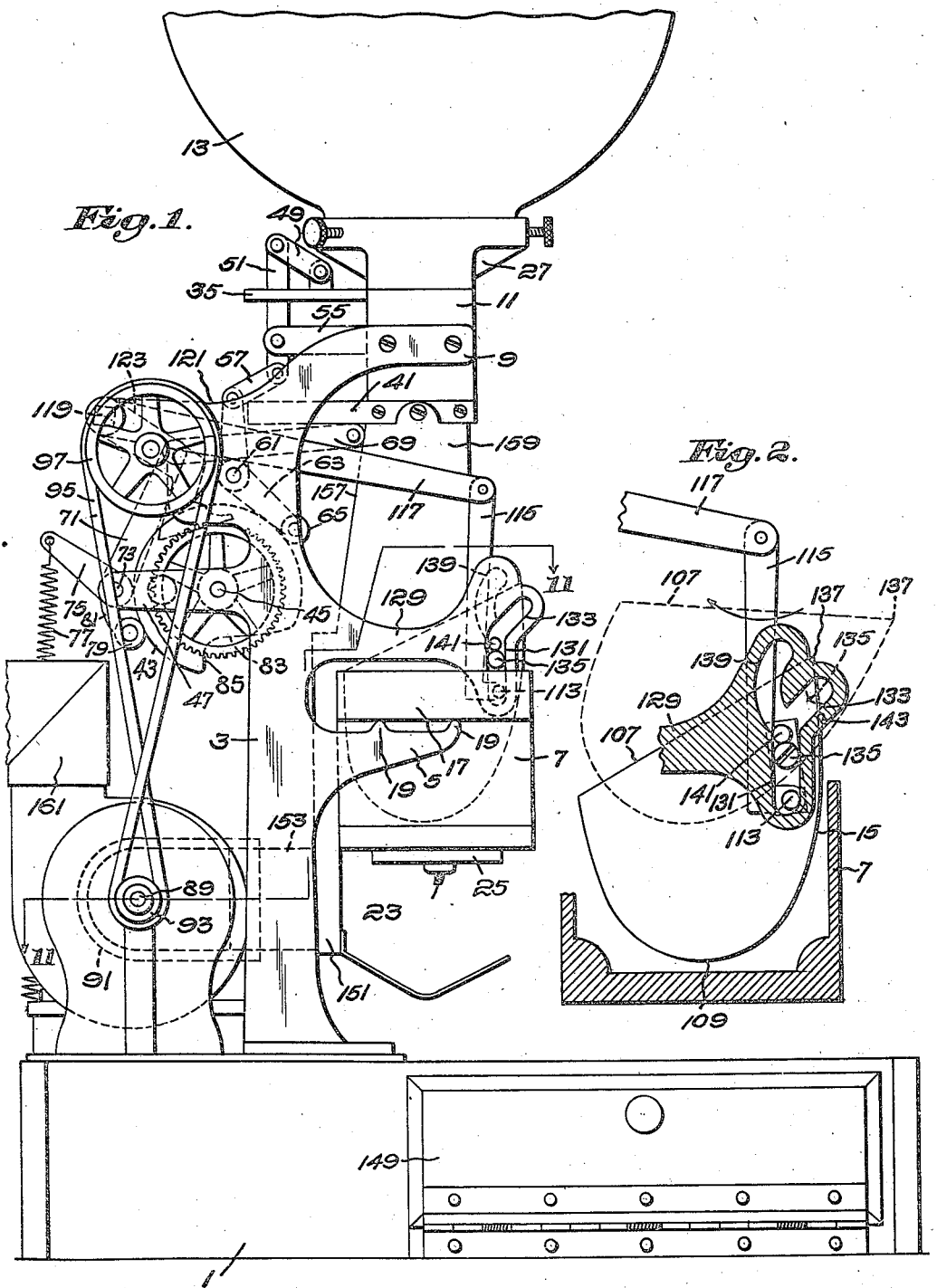

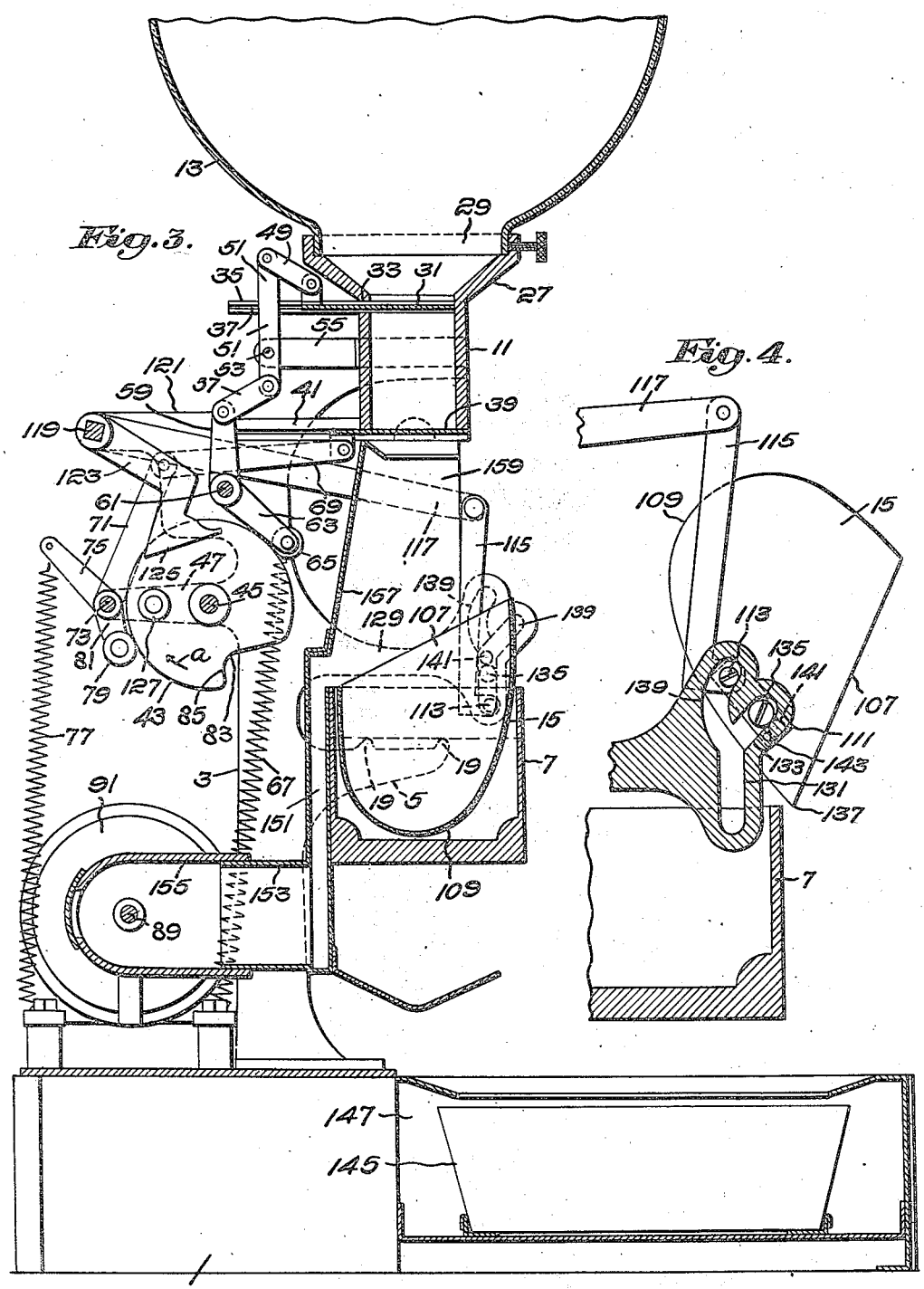

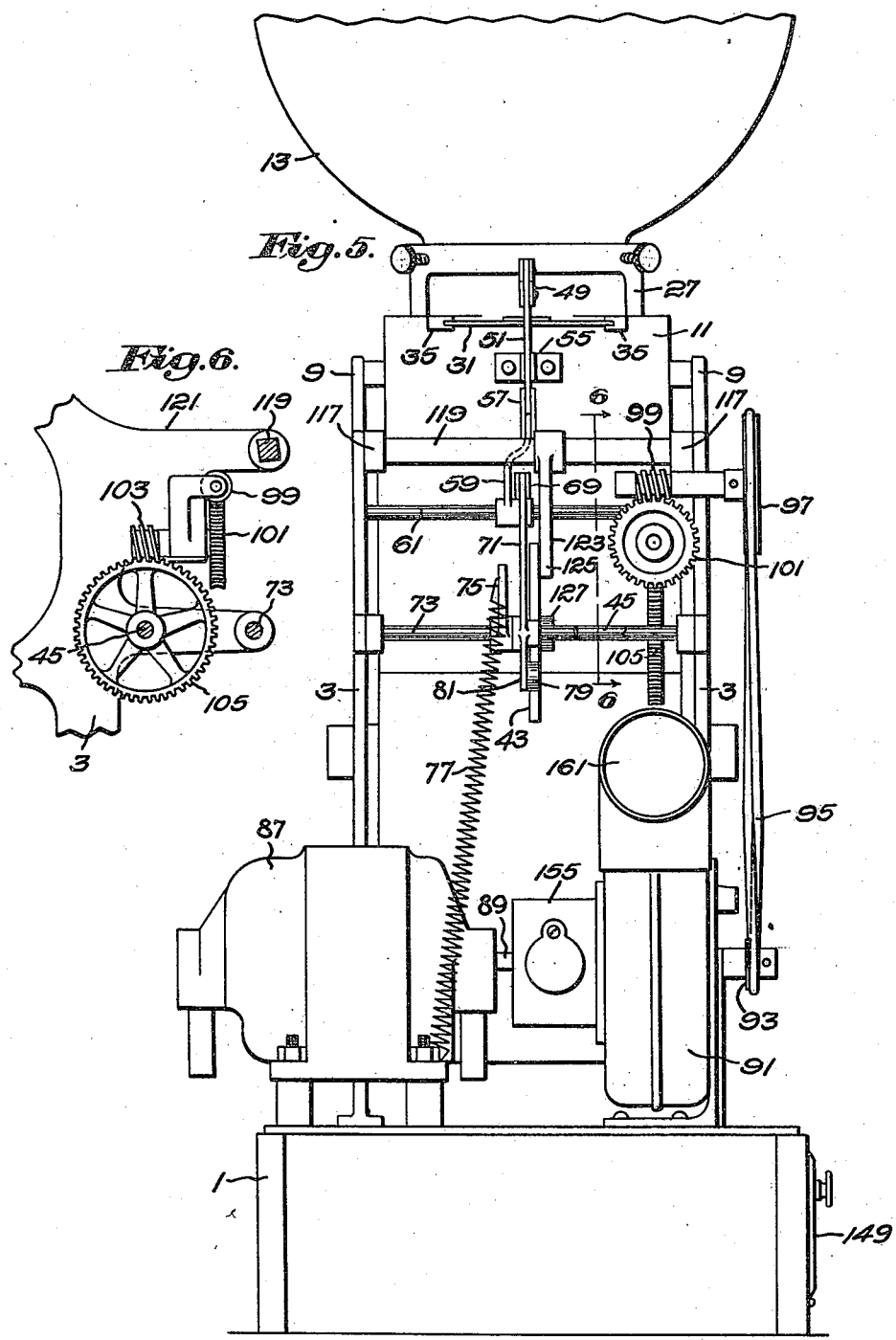

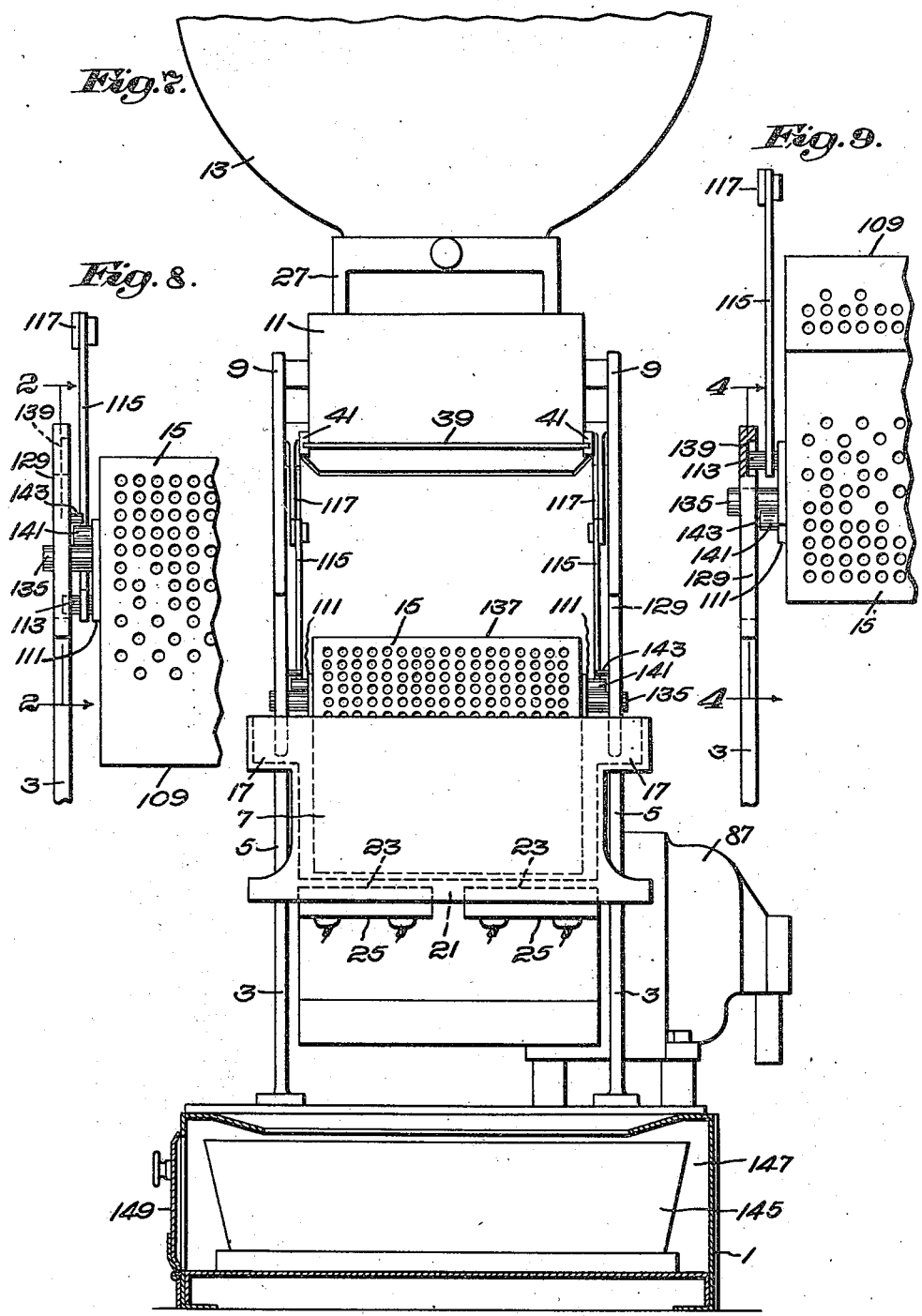

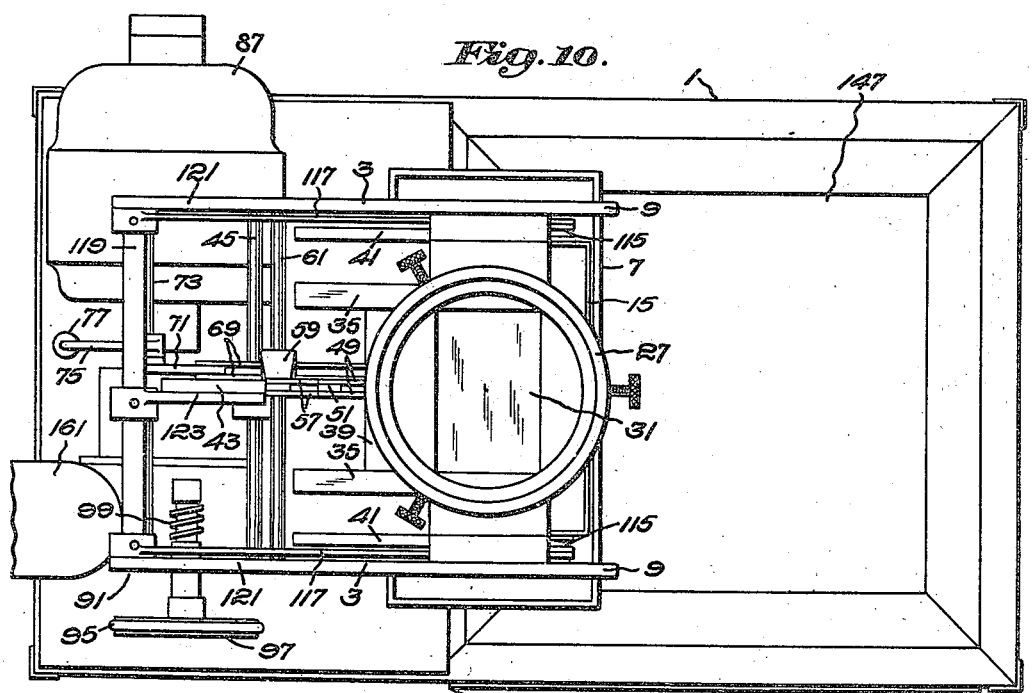
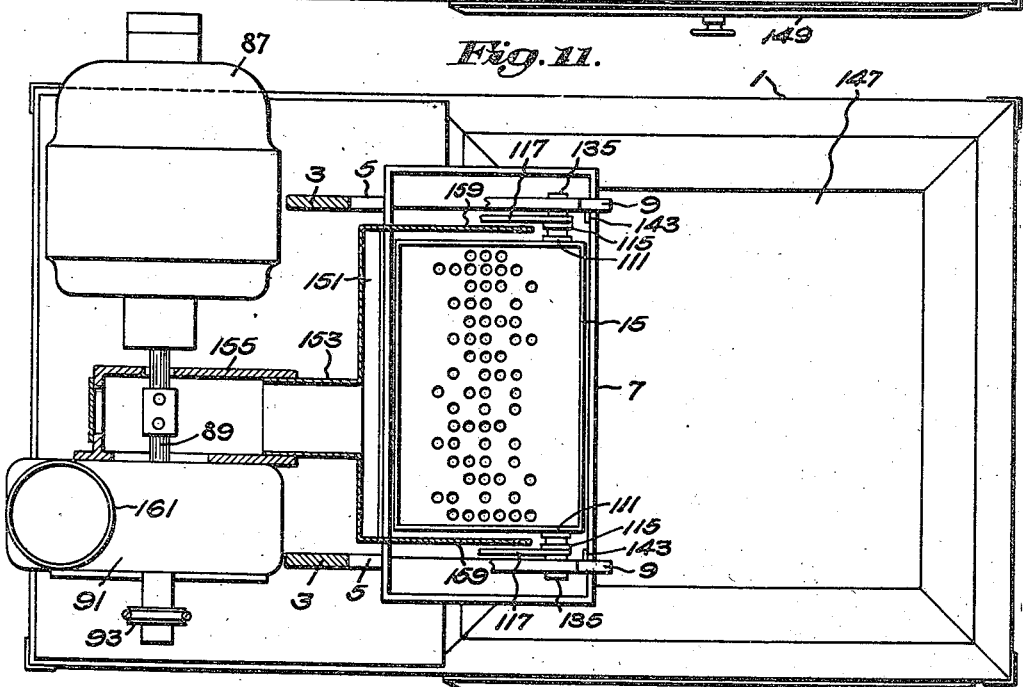

Patented June 11, 1935

2,004,500

UNITED STATES PATENT OFFICE 2,004,500

COOKING MACHINE

Eugene A. Brunelle, Somersworth, N. H.

Application May 6, 1932, Serial No. 609,664

8 Claims. (Cl. 53—7)

My invention, which relates to machines for frying nuts and the like, and has among its objects the provision of a machine of compact construction which will automatically place successive batches of nuts in hot cooking fat and discharge them therefrom when fried, will be best understood from the following description and the accompanying drawings of one form of machine constructed according to the invention, the scope of which latter will be more particularly pointed out in the appended claims.

In the drawings:—

Fig. 1 is a side elevation of a machine constructed according to the invention;

Fig. 2 is a section on the line 2—2 of Fig. 8, and illustrates a detail of the basket moving and tilting mechanism;

Fig. 3 is a vertical longitudinal section of the machine according to Fig. 1;

Fig. 4 is a section on the line 4—4 of Fig. 9, and corresponds to Fig. 2 with the parts in a different operative position;

Fig. 5 is a rear elevation of the machine constructed according to Fig. 1;

Fig. 6 is a section on the line 6—6 of Fig. 5;

Fig. 7 is a front elevation of the machine constructed according to Fig. 1;

Fig. 8 illustrates a fragment of the device as viewed in Fig. 7 with the fat container removed;

Fig. 9 is a view corresponding to Fig. 8 with the parts in a different operative position;

Fig. 10 is a plan of the machine constructed according to Fig. 1; and

Fig. 11 is a section on the line 11—11 of Fig. 1.

Referring to the drawings, the machine herein illustrated comprises a base 1 for supporting the operative parts of the machine. Carried by the base are a pair of spaced vertical standards 3 having laterally projecting arms 5 which removably support the container 7 for the fat in which the nuts are cooked. At their upper ends, these standards have forwardly projecting arms 9 which carry a combined chute and measuring device 11 for delivering batches of nuts from the hopper 13, carried by said device, to a basket 15 supported for movement into and out of the fat container 7.

As shown, the fat container 7 is provided at opposite ends with projecting lugs 17 which slidably rest upon the upstanding lugs 19 on the arms 5 so that the container can be readily removed for cleaning and inspection. Preferably, the container is formed of metal, such as aluminum, constituting a good heat conductor, and has its bottom wall 21 recessed as indicated at 23 (Fig. 7) for receiving the electric heating coil units 25 for heating the fat.

Herein, the measuring device has a body portion in the form of a chute 11 (Fig. 3) provided at its upper end with a funnel 27. In the present construction, this funnel carries the hopper 13 for the uncooked nuts, said hopper preferably being formed as a glass bowl having a bottom opening 29 for discharging the nuts into the funnel 27. At the upper end of the chute 11 is a valvular device which herein takes the form of a plate 31 extending through an opening 33 in the back wall of the chute. As shown, the plate 31 is slidably supported at opposite ends on guide bars 35 each of which has a groove 37 for receiving the edge of the plate. Herein, these bars extend through the opening 33, at the ends of the plate, across the chute at opposite sides thereof. At the bottom of the chute 11 is a plate 39 mounted similarly to the plate 31 on guide bars 41 carried by the chute.

As will be obvious, by operating the slide plates 31 and 39 in such way that one opens the chute 11 when the other closes it, measured quantities of nuts may be discharged from the hopper 13 into the basket 15.

For operating the slide plates 31 and 39, in the present embodiment of my invention a rotary cam disk 43 is provided, this cam being mounted on a shaft 45 rotatably supported at opposite end portions thereof on arms 47 projecting rearwardly from the vertical standards 3. As shown, the upper slide plate 31 is connected by a link 49 to a lever 51 fulcrumed at 53 on a stationary arm 55 carried by the chute 11. The opposite end of the lever 51 is connected by a link 57 to the end of the upper arm 59 of a bell crank lever, which latter has a spindle 61 rotatably carried at opposite end portions thereof by the two standards 3. The other arm 63 of this bell crank lever has a roller 65 resting upon the periphery of the cam disk 43 and urged into contact therewith by a tension spring 67.

The other slide plate 39, as shown, is connected by a link 69 to the upper arm 71 of a bell crank lever having a spindle 73 rotatably supported at opposite end portions thereof on the ends of the arms 47, this spindle carrying an arm 75 to which is connected a tension spring 77 for urging the roller 79 carried by the other arm 81 of the bell crank lever into contact with the periphery of the cam disk 43.

As shown, the shaft 45 is rotated slowly in the direction of the arrow $a$ (Fig. 3) to bring the recess 83 of the cam disk successively under the rollers 79 and 65. Herein, this recess has the steeply pitched side 85 so as to move the slide plate 39 quickly to permit quick discharge of the nuts in the measuring device 11 into the basket 15 when the latter is in raised position, as will hereinafter be explained. As shown, the rollers 65 and 79 are positioned approximately at diametrically opposite sides of the cam disk so that the slide plate 31 will permit discharge of nuts into the chute 11 when the lower plate 39 closes the chute, while the plate 39 will be moved to open the chute when the upper slide plate 31 closes it.

As shown, the shaft 45 for driving the cam disk 43 is driven by an electric motor 87 (Fig. 5) mounted on the base 1 of the machine. Herein, the shaft 89 of this motor is directly connected to a rotary exhauster 91, the end of the shaft opposite the motor having the belt pulley 93 about which passes a belt 95 for driving a pulley 97. The pulley 97, as shown, drives a worm 99 (Figs. 5 and 6) cooperating with a worm wheel 101, which latter drives a second worm wheel 103 cooperating with a second worm wheel 105, the latter being carried by the shaft 45 so that said shaft is slowly rotated when the motor 87 is in operation.

The basket which holds the articles being cooked herein comprises imperforate end walls 107 connected by lateral walls 109 of foraminous material. Each end plate of the basket, as illustrated, has secured thereto a plate 111 (Figs. 7, 8 and 9) which carries a pivot pin 113. To each of these pivot pins is connected one end of a link 115, the opposite ends of said links being pivotally connected to arms 117. The respective arms 117 are carried at the opposite end portions of a rock shaft 119 (Figs. 3 and 5), the latter being pivotally supported at opposite ends on the rearwardly projecting arms 121 of the vertical standards 3. At its central portion the shaft 119 carries an arm 123 (Figs. 3 and 5) having a toe 125 which cooperates with a laterally projecting roller pin 127 carried by the cam disk. As the cam disk rotates, the pin 127 strikes the toe 125 and swings the arm 123 in a counter-clockwise direction, as viewed in Fig. 3, so as to rock the shaft 119. This raises the arm 117 to lift the basket 15 to remove the nuts from the receptacle 7.

As herein illustrated, the standards 3 carry forwardly projecting arms 129 between which the basket 15 is positioned. These arms are provided with vertically extending slots 131 terminating in upwardly and forwardly inclined portions 133 into which project the pivot pins 113 carried on the ends of the basket. Above the pivot pins 113, as viewed in Figs. 2 and 8, each end of the basket is provided with a pin 135, so that when the basket is being raised from the full line to the dotted line position of the same shown by Fig. 2 the pin 135 enters the portion 133 of the slot and causes the links to swing around their pivotal connections to the arms 117 while being raised, which in effect moves the basket laterally while being raised so that its forward edge 137 assumes a position in front of the front wall of the fat receptacle 7, as shown by the basket in its dotted line position in Fig. 2. Continued upward motion of the arms 117 causes the pins 113 to enter the shallow arcuate grooves 139 formed on the inner sides of the arms 129 and communicating with the slots 131. This prevents the links from swinging rearwardly around their pivotal connections to the arms 117 as the basket tilts about the fulcrums for the pins 135 afforded by abutments formed by the end surfaces of the slots 133. When the basket is moving from its dotted line position shown in Fig. 2 toward the position thereof shown in Fig. 4, that is to say, when the pin 113 is in an intermediate portion of the length of the groove 139, the basket, due to the weight of the nuts as the same tend to slide toward the edge 137, tilts about the fulcrum afforded by the pins 113 and causes the pins 141 carried by the ends of the basket to strike the pins 143 carried at the inner sides of the arms 129, the final tilting movement of the basket occurring about the fulcrum afforded by the contacting sides of the pins 141 and 143.

In the position shown by Fig. 4 of the drawings, the contents of the basket are dumped. The basket is then returned to the fat container by lowering of the arms 117, and, when the basket is in approximately the dotted line position shown by Fig. 2, the lower side plate 39 moves to the left as viewed in Fig. 3 to permit the contents in the chute 11 to fall into the basket. In this position the bottom of the basket is approximately at or slightly above the level of the fat in the container 7, so that when the nuts fall into the basket the fat will not be splashed. The basket is then lowered to its full line position shown by Fig. 2.

As herein illustrated, the nuts when dumped from the basket fall into a tray 145 contained in a compartment 147 in the base of the machine, from which compartment the tray may be slid through the hinged door 149 on the side of the compartment.

As herein illustrated, behind the fat container 7 and resting against the rear side of the same is a flattened duct 151 having an outlet 153 connected with the intake 155 of the exhauster 91. The rear wall 157 of this duct is continued upwardly to adjacent the lower end of the chute 11. At each side of this upwardly extending portion of said wall are forwardly extending walls 159 embracing the opposite sides of the basket. This construction provides a hood-like structure for the fat container so that the fumes arising therefrom are caught and drawn down the duct 151 and discharged through the outlet pipe 161 of the exhauster to any convenient place of disposal.

It will be understood that wide deviations may be made from the embodiment of the invention herein disclosed without departing from the spirit thereof.

I claim:

1. A machine of the character described having, in combination, a container for cooking liquor, a movable basket for holding the articles while being cooked in said liquor, a hopper for the articles to be cooked, article feeding means for delivering measured quantities of the articles from said hopper to said basket comprising article discharge means from said hopper and article delivery means to said basket, a rotary exhauster for removing the fumes from said liquor, a motor, a common shaft for said motor and exhauster, a second shaft, a reduction gear connection between said shafts, and cam means on said second shaft for moving said basket and for operating said article discharge and article delivery means.

2. A machine of the character described having, in combination, a container for cooking liquor, a movable basket for holding the articles while being cooked in said liquor, a hopper for the articles to be cooked, article feeding means for delivering measured quantities of the articles from said hopper to said basket comprising article discharge means from said hopper and article delivery means to said basket, a rotary exhauster for removing the fumes from said liquor, a motor, a common shaft for said motor and exhauster, a second shaft, a reduction gear connection between said shafts, and a common cam on said second shaft for moving said basket and for operating said article discharge and article delivery means.

3. A machine of the character described having, in combination, a base, a pair of spaced vertical standards carried by said base, a container for cooking liquor carried by said standards, a hopper for articles to be cooked carried by said standards above said container, a movable basket for holding the articles while in said liquor, conduit means for delivering articles from said hopper to said basket, a pair of valvular devices for controlling the passage of articles through said conduit means, a shaft carried at opposite end portions thereof by said standards, a motor on said base for driving said shaft, and mechanism operated by said shaft for operating said basket and said valvular devices.

4. A machine of the character described having, in combination, a base, a pair of spaced vertical standards carried by said base, a container for cooking liquor carried by said standards, a hopper for articles to be cooked carried by said standards above said container, a movable basket for holding the articles while in said liquor, conduit means for delivering articles from said hopper to said basket, a pair of valvular devices for controlling the passage of articles through said conduit means, a rotary exhauster for removing the fumes from said liquor, a motor on said base, a common shaft for said motor and exhauster, a second shaft carried at opposite end portions thereof by said standards, a gear reduction drive operatively connecting said shafts, and mechanism operated by said second shaft for operating said basket and said valvular devices.

5. A machine of the character described having, in combination, a cooking liquor container having a wall with an upper longitudinal edge portion, a trough-shaped, foraminous basket having a longitudinal edge portion and adapted to hold granular material, said basket being movable vertically and laterally relative to said container, means for raising said basket from the liquor and moving it laterally to position said edge portion thereof above and at the outer side of said edge of said wall of said container while the remainder of said basket is above the liquor and for tilting said basket while in such position to discharge the contents thereof over said edge and then return the basket to the liquor; said means including a vertically movable member, a link for suspending said basket pivotally connected at one portion thereof to said member and at another portion thereof to said basket for raising and lowering the latter and moving it transversely relative to said container, mechanism for swinging said link about its pivotal connection to said member for moving said basket laterally to so position said edge portion thereof, and stop means on said basket and cooperating abutment means operative upon upward movement of said link for tilting said basket, when so positioned, about its pivotal connection to said link for discharging the contents of said basket.

6. A machine of the character described having, in combination, a cooking liquor container having a wall with an upper longitudinal edge portion, a trough-shaped, foraminous basket having a longitudinal edge portion and adapted to hold granular material, said basket being movable vertically and laterally relative to said container, means for raising said basket from the liquor and moving it laterally to position said edge portion thereof above and at the outer side of said edge of said wall of said container while the remainder of said basket is above the liquor and for tilting said basket while in such position to discharge the contents thereof over said edge and then return the basket to the liquor; said means including an operatively horizontal lever mounted for oscillatory movement in a vertical plane, a link for suspending said basket pivotally connected at one portion thereof to said lever and at another portion thereof to said basket whereby said link and basket are raised and lowered, cam means operative upon upward movement of said link and basket for swinging said link about its pivotal connection to said lever for moving said basket laterally to so position said edge portion thereof, and stop means on said basket and cooperating abutment means operative upon further upward movement of said link for tilting said basket, when so positioned, about its pivotal connection to said link for discharging the contents of said basket.

7. A machine of the character described having, in combination, a cooking liquor container having a wall with an upper longitudinal edge portion, a trough-shaped, foraminous basket having a longitudinal edge portion and adapted to hold granular material, said basket being movable vertically and laterally relative to said container, means for raising said basket from the liquor and moving it laterally to position said edge portion thereof above and at the outer side of said edge of said wall of said container while the remainder of said basket is above the liquor and for tilting said basket while in such position to discharge the contents thereof over said edge and then return the basket to the liquor; said means including an operatively horizontal lever pivoted for oscillation in a vertical plane, a rotary cam for so oscillating said lever, a link for suspending said basket disposed in a vertical plane and pivotally connected at one portion thereof to said lever and at another portion thereof to said basket for suspending the latter and raising and lowering it, stationary cam means, follower means for said stationary cam means operatively associated with said link for swinging the latter about its pivotal connection to said lever upon upward movement of said link for moving said basket laterally to so position said edge portion thereof, and cooperating stop and abutment means operatively associated with said basket for tilting the latter, when so positioned, about its pivotal connection to said link upon continued upward movement of the latter for discharging the contents of said basket.

8. A machine of the character described having, in combination, a cooking liquor container having a wall with an upper longitudinal edge portion, a trough-shaped, foraminous basket having a longitudinal edge portion and adapted to hold granular material while being cooked in said liquor, said basket being movable vertically and laterally relative to said container, means for raising and lowering said basket and moving it laterally relative to said container comprising a mechanism having a swinging link for suspending said basket, which link is pivotally connected to said basket, means operative to raise and swing said link for positioning said edge portion of said basket above and at the outer side of said edge of said wall of said container while the remainder of said basket is above the liquor, mechanism comprising a stop means on said basket and a cooperating abutment means for tilting said basket when in such position for dumping its contents when said basket is further raised by said link, and guide means for holding said stop means and abutment means in cooperating relation while said basket is being tilted.

EUGENE A. BRUNELLE.